H. A. HOLZER.
MINE CAR WHEEL.
APPLICATION FILED APR. 5, 1915.
1,144,302.
Patented June 22, 1915.
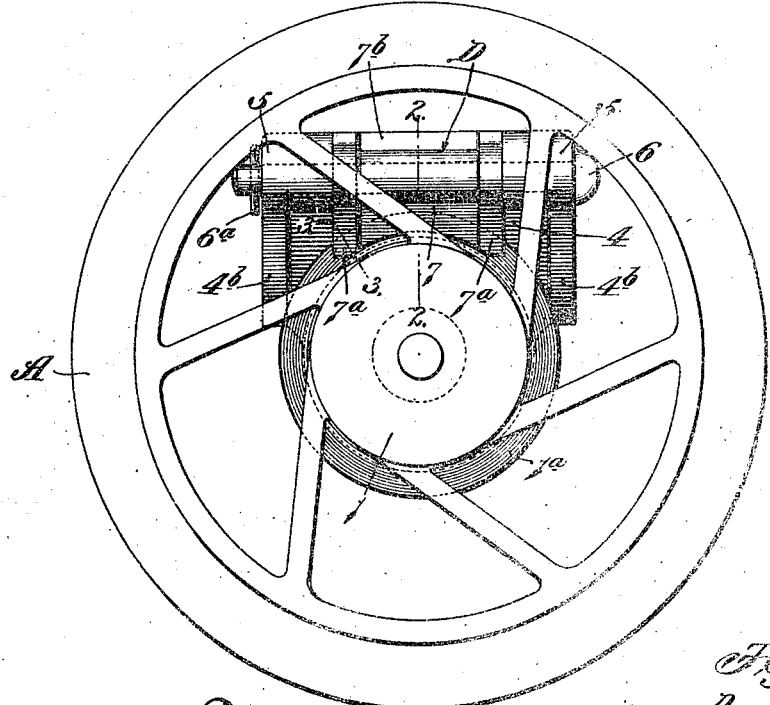
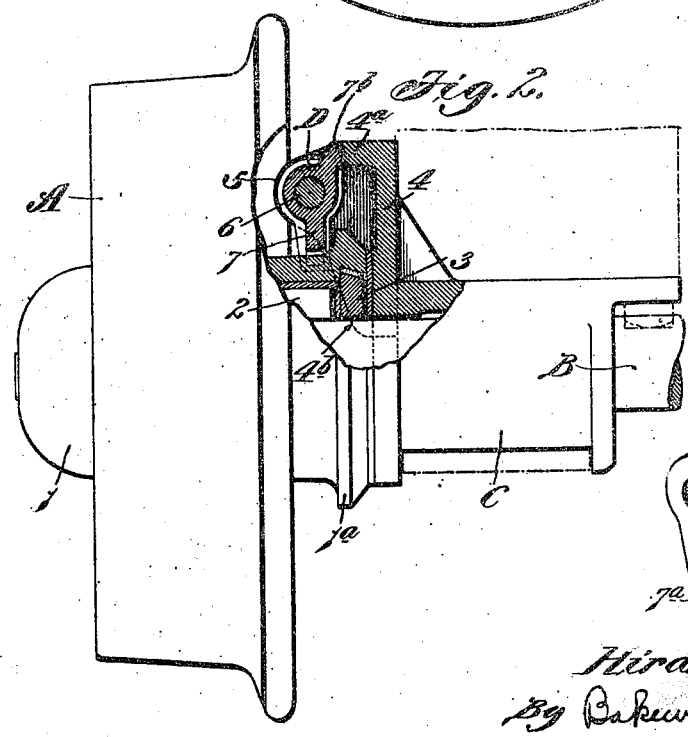
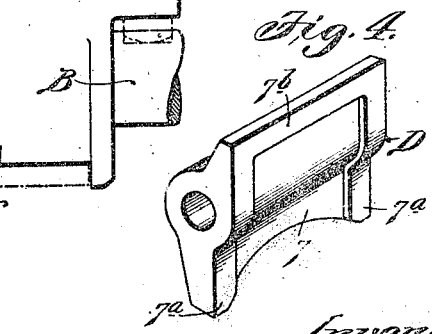
Inventor
Hiram A. Holzer
By Bakewell Cornwell Attys

UNITED STATES PATENT OFFICE.

HIRAM A. HOLZER, OF PITTSBURG, KANSAS, ASSIGNOR TO UNITED IRON WORKS COMPANY, OF SPRINGFIELD, MISSOURI, A CORPORATION OF MISSOURI.

MINE-CAR WHEEL.

1,144,302.  Specification of Letters Patent.  Patented June 22, 1915.

Application filed April 5, 1915. Serial No. 19,267.

*To all whom it may concern:*

Be it known that I, HIRAM A. HOLZER, a citizen of the United States, residing at Pittsburg, Kansas, have invented a certain new and useful Improvement in Mine-Car Wheels, of which the following is a full, clear, and exact description, such as will enable others skilled in the art to which it appertains to make and use the same.

This invention relates to mine car wheels of the type in which the axle box is provided with a removable member for preventing the wheel from moving longitudinally of the axle.

One object of my present invention is to provide a wheel structure of the character mentioned, in which the axle box is equipped with a removable hood of novel design that has vertically-disposed integral bearing ribs which coöperate with a flange on the hub of the wheel to prevent the wheel from moving longitudinally of the axle, said bearing ribs being disposed substantially radially with reference to the hub of the wheel and preferably arranged at the upper side of the hub on opposite sides of the longitudinal axis of the wheel axle.

Another object is to provide a strong and serviceable wheel structure for mine cars that can be manufactured cheaply and which is so designed that the wheel can be applied and removed easily.

Other objects and desirable features of my invention will be hereinafter pointed out.

Figure 1 of the drawings is an end elevational view of a wheel structure embodying my invention. Fig. 2 is a side elevational view of same partly in vertical section, taken on the line 2—2 of Fig. 1. Fig. 3 is a detail view taken on the line 3—3 of Fig. 1; and Fig. 4 is a perspective view of the removable hood on the axle box.

Referring to the drawings, which illustrate the preferred form of my invention, A designates a wheel that is particularly adapted for use on mine cars, trucks and similar vehicles, and B designates the axle on which said wheel is mounted, said wheel having a hub portion 1 that receives the outer end portion of the axle B. The axle B is mounted in an axle box C which is secured to the body of the vehicle (indicated by broken lines in Fig. 2), and said axle box is provided with a removable hood D that prevents the wheel from moving longitudinally of the axle. In the embodiment of my invention herein shown the hub portion 1 of the wheel A is equipped with a roller bearing comprising longitudinally-disposed rollers 2, and a washer 3 is arranged at the inner end of said hub portion 1 so as to confine the lubricant that is used to lubricate the bearing of the wheel. The inner end of the hub of the wheel bears against the outer end of the axle box C and said box is provided with a vertically-disposed flange or plate portion 4 that projects upwardly from the portion of the box C through which the axle passes and bears against the side of the vehicle body to which the axle box is connected, as shown clearly in Fig. 2. This flange or plate portion is wider than the portion of the box C through which the axle passes and at the outer ends of same are two forwardly-projecting integral lugs 5 that are spaced away from each other, as shown in Fig. 1, said lugs 5 being tied together by means of a horizontally-disposed flange 4ª at the upper end of the plate portion 4 to which the lugs 5 are integrally connected. If desired, the lugs 5 can be reinforced and strengthened by means of gussets 4ᵇ located at the side edges of the plate portion 4 and integrally connected to same and to the lugs 5. The hood D fits between the forwardly-projecting lugs 5 on the axle box and is retained in position by means of a removable fastening device 6 that passes transversely through said lugs and hood, said fastening device either consisting of a bolt provided with a nut or a pin provided at one end with a hole for receiving a cotter key 6ª, as shown in Fig. 1.

The hood D has a depending portion 7 whose lower edge conforms to the curvature of the hub portion 1 of the wheel A, and said depending portion is equipped with two vertically-disposed bearing ribs 7ª that coöperate with an annular flange 1ª on the hub portion of the wheel to prevent the wheel from moving longitudinally of the axle, said bearing ribs being formed integral with the hood and arranged at the side edges of same so that they will be located above the hub of the wheel and on opposite sides of the longitudinal axis of the axle B. When the hood D is arranged in operative position, as shown in Figs. 1 and 2, a horizontally-disposed bearing rib 7ᵇ at the upper end of the hood bears against the flange 4ª at the upper end of the plate portion 4 of the axle box, and thus transmits the strains which the wheel exerts on the hood directly to the plate portion 4 of the axle box C. In other words, the hood D is so designed and arranged that any outward movement of the wheel tends to cause the hood D to turn on the pin or bolt 6 that holds said hood in position and thus forces the horizontally-disposed bearing rib 7ᵇ at the upper end of the hood tightly against the flange 4ª at the upper end of the plate portion 4 of the axle box. The lugs 5 that sustain the fastening device 6, of course, take up some of the strains which the wheel exerts on the hood D, but, in view of the fact that the flange 1ª on the wheel hub exerts pressure on the hood at a point below the lugs 5 and thus tends to turn it on its fulcrum, the strains on the lugs 5 are minimized or greatly reduced. The bearing ribs 7ª on the hood D are arranged substantially radially, with reference to the flange 1ª on the hub of the wheel, and as they have a comparatively slight bearing on said flange, friction between the wheel hub and the member that retains the wheel in position is reduced to a minimum. Still another advantage of such a structure is that the bearings ribs 7ª on the hood D engage the wheel hub at only two points and on opposite sides of the longitudinal axis of the wheel axle.

A wheel structure of the character above described can be manufactured at a low cost, and it is exceptionally strong and serviceable, owing to the fact that the axle box and the removable member on the axle box that retains the wheel in position consist of castings of simple design that can be made large enough and strong enough to stand up under rough usage. The hood D engages the flange on the hub of the wheel at only two points and in a direction substantially radial with respect to the axis of rotation of the wheel, so that friction is reduced to a minimum. The wheel can be applied and removed easily and without the necessity of disconnecting the axle box from the body of the vehicle, and still another desirable feature of such a structure is that the strains on the lugs 5 on the axle box which receive the fastening device 6 are reduced to a minimum, on account of the novel design of the retaining hood D and the way that it is mounted on the axle box.

Having thus described my invention, what I claim, and desire to secure by Letters Patent, is:

1. In a wheel structure of the character described, an axle box, a wheel having a hub provided with an annular flange, a removable hood pivotally mounted on said axle box and coöperating with the flange on said wheel hub to retain said wheel in position, and coöperating bearing surfaces on said hood and axle box arranged above the fulcrum of said hood.

2. In a wheel structure of the character described, an axle box, a wheel having a hub provided with an annular flange, a removable hood on said axle box having a portion that lies in front of the flange on said wheel hub, a retaining device for said hood arranged at approximately right angles to the axis about which the wheel revolves, and coöperating bearing surfaces on said hood and axle box arranged at a point above said retaining device.

3. In a wheel structure of the character described, an axle box, a wheel having a hub provided with an annular flange, forwardly projecting portions at the front end of said box, a removable hood arranged between said forwardly-projecting portions and coöperating with the flange on the wheel hub to retain the wheel in operative position, and a removable fastening device that passes through said hood and the forwardly-projecting portions on the axle box so as to retain said hood in position.

4. In a wheel structure of the character described, an axle box, a wheel having a hub whose inner end bears against the front face of said axle box, an annular flange on the hub of the wheel, a removable hood provided at its lower end with a depending portion that lies in front of said flange and at its upper end with a portion that bears against the axle box, and a removable retaining device for said hood arranged intermediate the upper and lower ends of the hood and extending approximately at right angles to the axis of rotation of the wheel.

5. In a wheel structure of the character described, an axle box provided at its front end with an upwardly-projecting flange that bears against the side of the vehicle body to which the axle box is connected, a wheel having a hub that bears against the front face of said axle box, an annular flange on said wheel hub, integral lugs projecting forwardly from the flange on said axle box and formed integral with a horizontally-disposed tie member on said flange, a hood arranged between said lugs and provided with a portion that bears against said tie member, a depending portion on said hood having a curved lower edge and provided with substantially vertically-disposed bearing ribs that coöperate with the flange on the wheel hub to retain the wheel in position, and means for securing said hood to the lugs on said axle box.

6. In a wheel structure of the character described, an axle box provided at its front end with an upwardly-projecting, plate-like portion that bears against the side of the vehicle body to which the axle box is connected, a wheel having a hub whose inner end bears against the front face of the axle box, an annular flange on said wheel hub, forwardly-projecting lugs on the plate portion of the axle box that are integrally connected to same and to a horizontally-disposed bearing rib on said plate portion, and a removable retaining hood for the wheel detachably connected to said lugs and provided with a portion that bears against the horizontally-disposed bearing rib on the plate portion of the axle box.

In testimony whereof I hereunto affix my signature in the presence of two witnesses, this 1st day of April 1915.

HIRAM A. HOLZER.

Witnesses:
I. A. DESBAUNE,
W. L. STRAWN.